United States Patent [19]

Whitaker

[11] Patent Number: 4,685,061

[45] Date of Patent: Aug. 4, 1987

[54] VEHICLE MOVEMENT MONITORING SYSTEM

[75] Inventor: Charles D. Whitaker, Dayton, Ohio

[73] Assignee: Ketek Inc., Dayton, Ohio

[21] Appl. No.: 710,823

[22] Filed: Mar. 12, 1985

[51] Int. Cl.[4] .............................................. G06F 15/74

[52] U.S. Cl. .................................... 364/424; 364/561; 377/20; 340/52 F

[58] Field of Search ............... 364/424, 561, 550, 551, 364/200; 360/5, 6; 340/52 R, 52 F; 377/20

[56] References Cited

U.S. PATENT DOCUMENTS

| | | | |
|---|---|---|---|
| 4,031,363 | 6/1977 | Freeman et al. | 364/424 |
| 4,044,337 | 8/1977 | Hicks et al. | 364/200 |
| 4,072,850 | 2/1978 | McGlynn | 364/424 |
| 4,258,421 | 3/1981 | Juhasz et al. | 364/424 |
| 4,338,512 | 7/1982 | Ludwig | 377/20 |
| 4,533,962 | 8/1985 | Decker et al. | 360/5 |
| 4,539,641 | 9/1985 | Kawashimo et al. | 364/561 |
| 4,561,057 | 12/1985 | Haley, Jr. et al. | 364/424 |

*Primary Examiner*—Gary Chin
*Attorney, Agent, or Firm*—Biebel, French & Nauman

[57] ABSTRACT

An apparatus is disclosed for monitoring use of a motor vehicle, wherein the vehicle provides a vehicle speed input signal, which is directed to the apparatus. The apparatus generates a real time signal. A processor receives the vehicle speed input signal and the time signal and generates therefrom an information signal corresponding to certain data. This data includes a starting time and a duration for each period of operation of the vehicle, and a distance covered during such period, and can include an indication of the purpose of the vehicle usage. The information signal is stored in memory as it is generated. An output device, which may be a printer, receives the stored data for output of the data.

22 Claims, 9 Drawing Figures

VEHICLE MOVEMENT MONITORING SYSTEM

BACKGROUND OF THE INVENTION

The present invention relates generally to data recording devices and, more particularly, to such a device that is specifically adapted for use with a motor vehicle.

Owners of motor vehicles that are used for business purposes are faced with the problem of making the most economical use of their business vehicles. Many companies and individuals own vehicles which are used strictly for business purposes, while many others own vehicles which are used by the vehicle operators both for business and personal purposes. In either case, where the operator of the vehicle is not also the owner, it is difficult for the owner to supervise the use of the vehicle, both to ensure that it is used for business purposes, as well as to determine whether the operator is making the most efficient and productive use of the vehicle.

This problem, while significant in itself, is compounded by the fact that the operator of the vehicle must be able to distinguish between use of the vehicle for business and for personal purposes. Beginning with 1985 tax years, the U.S. tax laws require the keeping of contemporaneous documentation of business and personal usage of a motor vehicle if the vehicle owner wishes to treat all or part of the cost of operating the vehicle as a business expense. Personal useage of the vehicle is taxable as income to the operator. The keeping of the necessary records represent a significant burden. In part, this is because they must be truly contemporaneous, so that the vehicle operator must always have a pen and notebook or the like on hand, and must always remember to record the vehicle mileage and the purpose of any trip.

What is needed is some device that will aid the vehicle operator in the keeping of such records. Not only will such records be useful for tax purposes, but also in ensuring efficient and productive use of the vehicle. Such a system must be essentially foolproof, in that it must protect against the operator forgetting or deliberately failing to record information. Further, the system must be relatively easy to use, and must produce a clear, concise record of the vehicle usage.

SUMMARY OF THE INVENTION

In accordance with the above needs, the present invention provides an apparatus for monitoring use of a motor vehicle, the vehicle including means for generating a vehicle speed signal. The apparatus includes means for receiving the vehicle speed input signal and clock means for generating a real time signal. A processor means receives the vehicle speed input signal and the time signal and generates therefrom an information signal corresponding to certain data. This data includes a starting time and a duration for each period of inactivity for the vehicle that is greater than a predetermined length. In addition, the data includes a starting time and a duration for, and a distance covered during, each period of operation of the vehicle.

A storage means receives the information signal as the information signal is generated, and accumulates and stores the data corresponding to the information signal as a storage signal. An output means is provided for periodically receiving the storage signal from the storage means for providing an output of the data.

The output means may include a printer for providing output of the gathered data in printed form.

The apparatus may also include an operator actuated input means for selectively generating an operator input signal corresponding to one of a plurality of differing selectable categories of usage for the vehicle during each period of its operation. The operator input signal is directed to the processor means, which receives the operator input signal and generates as part of the information signal data which identifies each of the periods of operation by one of the categories of usage.

Accordingly, it is an object of the present invention to provide an apparatus that can monitor the use of a motor vehicle; to provide such an apparatus that can identify periods of usage of the motor vehicle as business, investment or personal activity; to provide such an apparatus that can provide data including starting times, durations and distances for periods of activity for the vehicle; to provide such an apparatus that can be upgraded to optionally provide other data including vehicle identification, fuel consumption or maximum speeds; and to provide such an apparatus that is easily and reliably used by the vehicle operator.

Other objects and advantages of the present invention will be apparent from the following description, the accompanying drawings, and the appended claims.

DETAILED DESCRIPTION OF THE PREFERRED EMBODIMENT

Figure 1:
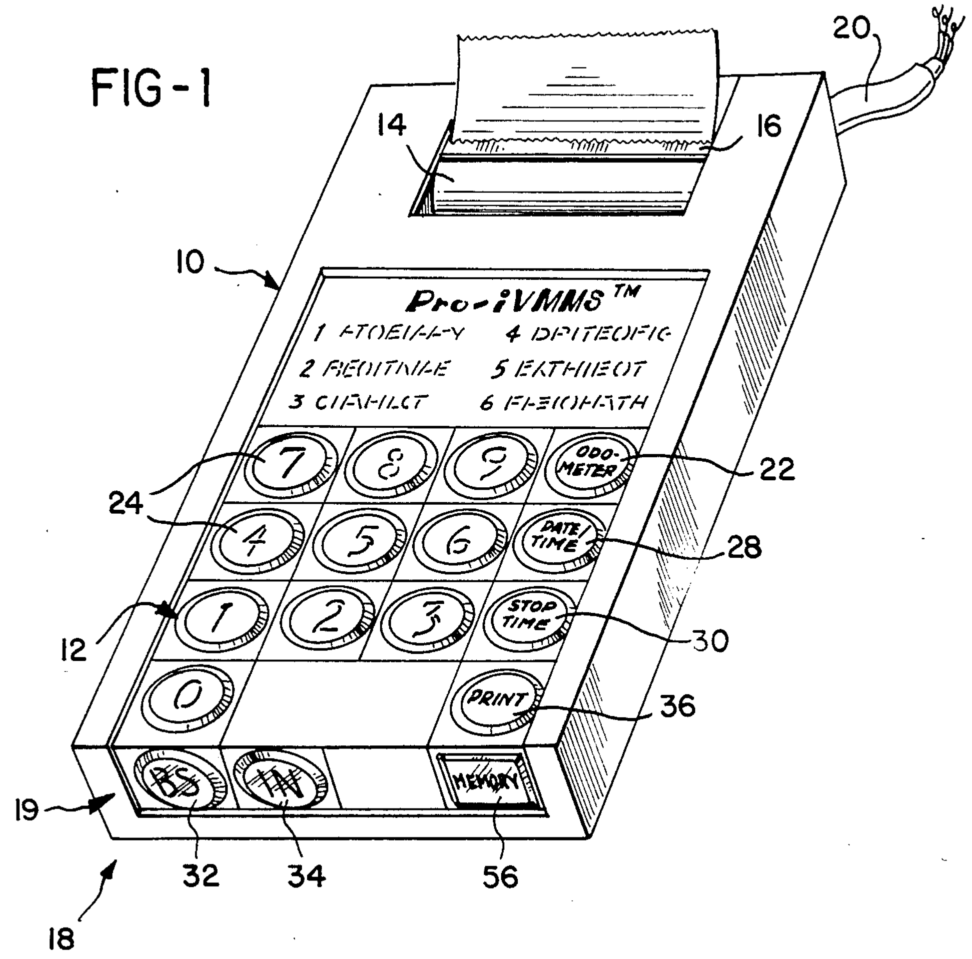
FIG. 1 is a perspective view of the apparatus of the present invention for monitoring the use of a motor vehicle.

The apparatus according to the present invention for monitoring the use of a motor vehicle can be seen by reference to FIG. 1. The apparatus is contained within a housing 10 that supports a multi-key input key pad 12. A roll of paper 14 is contained within housing 10, and a cutting edge 16 is positioned near the paper roll 14 to enable single sheets to be torn from the roll.

In the preferred embodiment, the apparatus shown in FIG. 1 is of an approximate size of 4.0"×8.0"×0.75" (10.16 cm×20.32 cm×1.91 cm). Of course, variations in size can easily be made, with a minimum limit dictated by keypad 12 and paper roll 14 (and printing equipment associated therewith to be discussed below). In normal operation, the apparatus is mounted beneath the vehicle dashboard so that the vehicle operator will observe the apparatus from the direction indicated by arrow 18. Consequently, the operator has access to only a portion 19 of keypad 12. An appropriate bracket (not shown) is used to secure housing 10 beneath the dashboard, and is further adapted to permit the housing 10 to be either pivoted downwardly or removed entirely from beneath the dashboard to enable access to the remainder of keypad 12 and paper roll 14.

A cable 20 extends from the rear of housing 10 to connect the apparatus to the vehicle power supply and to provide a vehicle speed input signal. This signal may be supplied from any appropriate vehicle speed sensor of the type typically used in connection with a vehicle cruise control or electronic speedometer. For example, the sensor may be magnetic, utilizing a Hall effect switch. The speed pick-up can be from the drive shaft, transmission, speedometer cable or electronic control module (ECM)/electronic control unit (ECU). The vehicle speed input signal will therefore preferably be a string of pulses, with the durational interval between pulses being determined by the vehicle speed. In a typical vehicle, approximately 2002 pulses will be produced per mile.

The detailed construction of the apparatus can be better understood by first considering the operation of the apparatus, as seen from the perspective of the vehicle operator. Initially, the operator moves the housing 10 to a position wherein the upper portion of keypad 12 is accessible. A current odometer reading, taken from the vehicle odometer, is entered into the apparatus by entering a series of digits using the numeric keys 24, followed by striking of an odometer key 22. Each stroke of a key of keypad 12 will be accompanied by a short beep tone from a beeper mounted within the device. Alternatively, a short flash of light from a keystroke indicator lamp can be used instead of or in addition to the sound indication. In any event, the operator is given a confirming indication that the data entry has been received.

At some point during the operation of the apparatus, typically after it has first been installed, it will be necessary to enter initial date and time values. This is done using keypad 12, by entering the date or time value in numerical fashion using keys 24, followed by actuation of date/time key 28. Normally, both values should be entered at the same time, so that the first values entered can be interpreted as the date, while the second value can be interpreted as the time.

As the vehicle is operated, the vehicle speed input signal is received by the apparatus, which calculates from the time interval between pulses the vehicle speed, and from the speed, the mileage traveled by the vehicle. When the vehicle has stopped for greater than a predetermined time interval, it is assumed that a trip has been completed. At this point, the starting time for the trip, the total mileage, and the duration of the trip are all stored in memory.

The stop time interval used for separating successive trips may be selected and/or changed by the vehicle operator. This is carried out by entering the desired value using numeric keys 24, followed by actuation of stop time key 30. The stop time may be set, for example, at five minutes, so that short stops such as those for traffic lights and the like will be ignored. If the operator's usage patterns for the vehicle permits, a longer interval may be selected so that, for example, refueling stops can be ignored.

At some time during the trip, or immediately thereafter but prior to expiration of the minimum stop time, the operator may actuate either "business" key 32 or "investment" key 34 to indicate the purpose for the operation of the vehicle. It should be noted that keys 32 and 34 will be accessible to the vehicle operator even when housing 10 is secured beneath the vehicle dashboard. Actuation of either key will store, along with the recorded information regarding the trip, data as to whether the trip relates to business or investment purposes. Both keys 32 and 34 are illuminated by LEDs, with the appropriate LED remaining illuminated following actuation of one of keys 32 or 34 until the completion of the present trip. In the event that more than one key is actuated during a single trip, the final key actuation is determinative. If neither key 32 or 34 is actuated, the trip is assumed to be for personal reasons.

At the end of each day's operation of the vehicle, print key 36 may be actuated, thereby causing a printer, to be described in detail below, to print upon paper roll 14 a summary of the day's operation of the vehicle.

Figure 2:
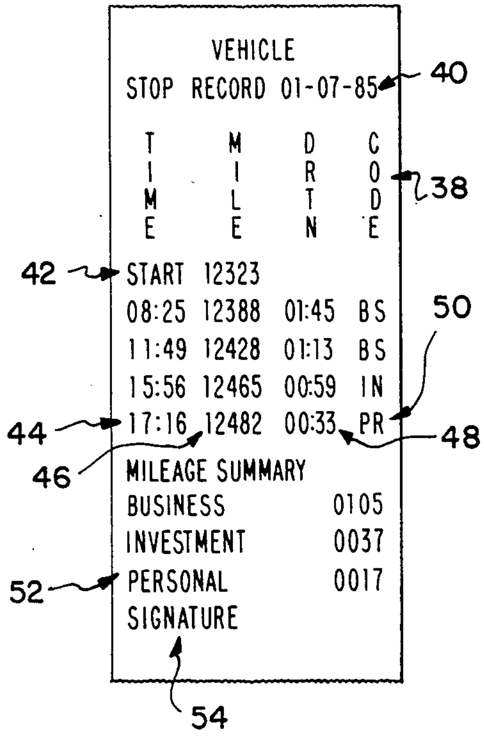
FIG. 2 is a repesentative sample of a daily report prepared using the apparatus.

A sample daily record of vehicle operation is presented in FIG. 2, and is printed on a single sheet 38 which is separated from the paper roll stored within the apparatus housing. The date is printed near the top of the sheet as indicated at 40, and the starting mileage for the vehicle is set forth at 42. Presented in columns are the starting times for each trip taken during the day, at 44, the vehicle mileage upon completion of the trip, at 46, the duration of the trip, at 48, and a code corresponding to the purpose of the trip, at 50. In column 50, "BS" represents business, "IN" represents investment and "PR" represents personal. A summary of the mileage by category for the day is presented at 52, and a place for the signature of the operator is provided at 54. Optionally, month-to-date totals may also be printed.

Other information can be provided on the report, depending upon the manner in which the apparatus is programmed. For example, the maximum speed attained by the vehicle during the course of the trip can be included. While this information may not be of interest to an individual vehicle owner, it can be of importance in supervising the use of company-owned vehicles by employees.

Normally, the operator will print the daily record 38 at the end of each day. This is not necessary, however, as the data will be retained within the apparatus memory. Actuation of time print key 36 may be immediately preceded by a numerical entry using numeric keys 24, whereupon a record for each of the most recent days corresponding to the entered number will be prepared. Despite the fact that more than one day has passed since the information was last printed, it will nonetheless be prepared with a separate sheet for each day's activities. The extent to which printing can be delayed is determined by the capacity of the apparatus memory, and a memory indicator 56 is provided that will illuminate when the memory is approaching a full condition, for example, when the memory is at 80% of capacity. This will alert the operator to print the stored data before any data can be lost due to insufficient memory space.

Figure 3A:
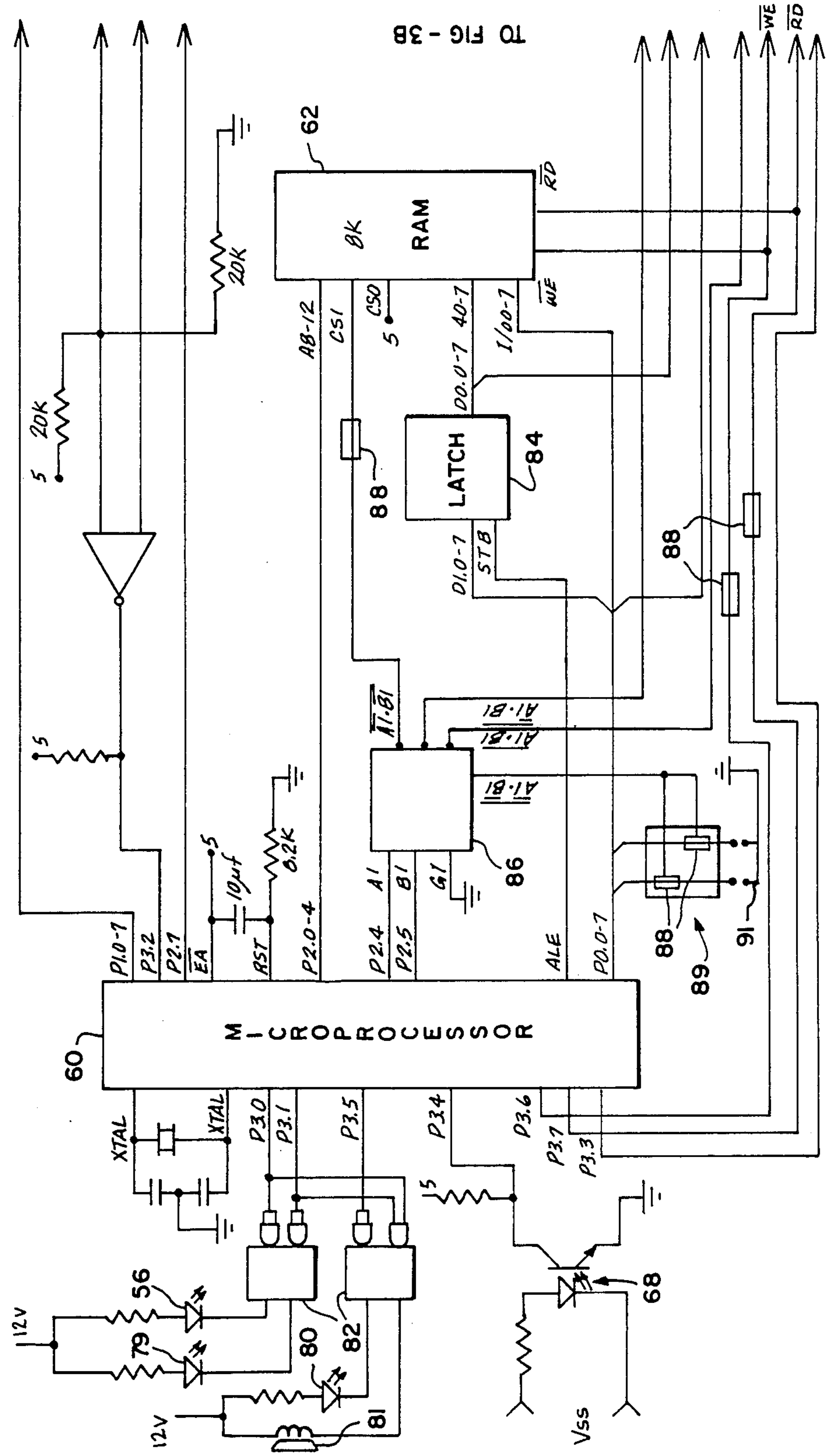
FIGS. 3A and 3B together are a schematic diagram of the control circuitry for the apparatus.
Figure 3B:
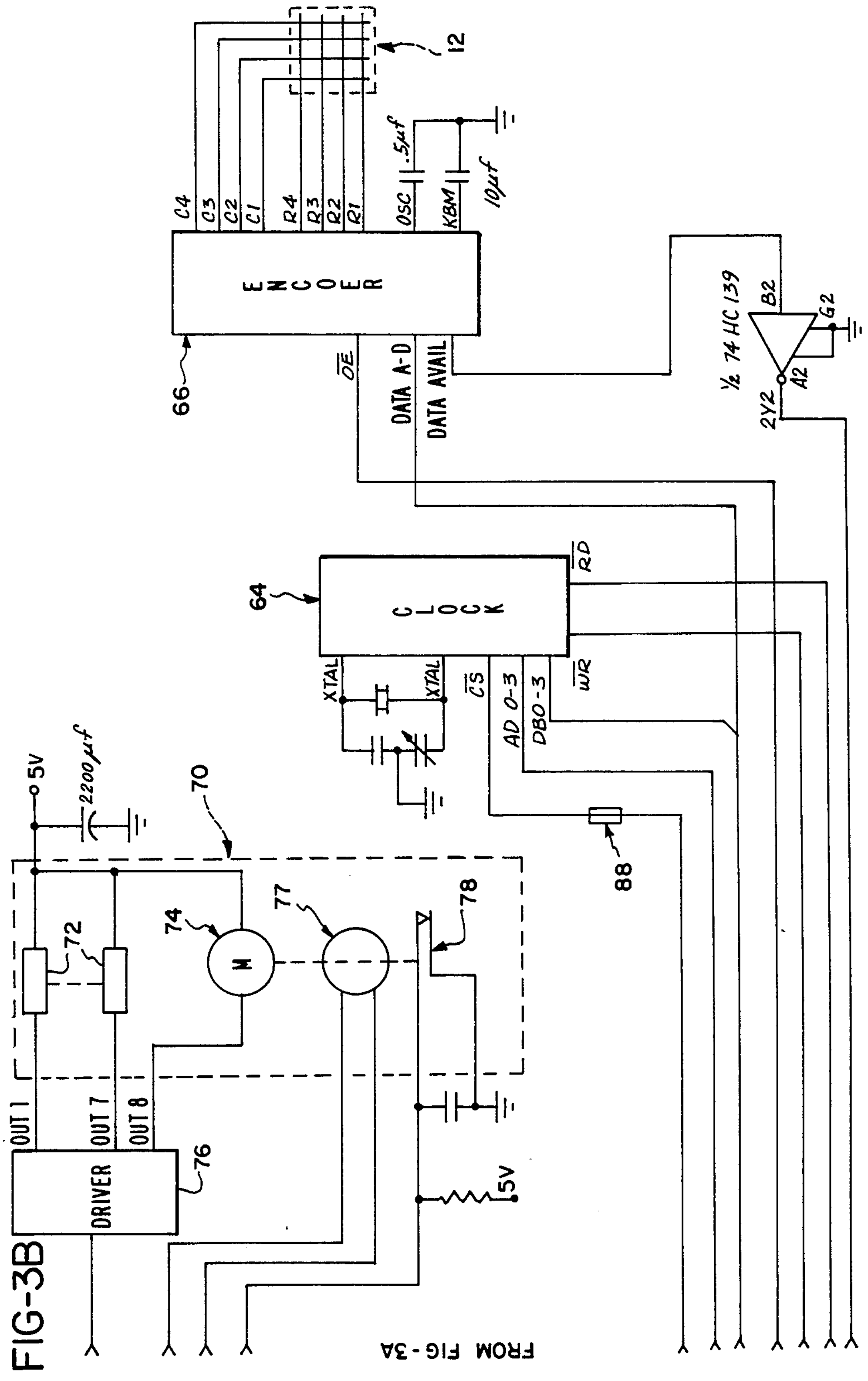

The operating circuitry for the apparatus is shown schematically in FIGS. 3A and 3B. The circuitry is based around microprocessor 60, which in the preferred embodiment is an 80C51 chip manufactured by Intel. Microprocessor 60 cooperates with an 8K RAM, shown as memory 62. This chip is a 6164L, manufactured by National Semiconductor Corp.

Other major components of the circuitry include real time clock 64, which is preferably an MM58274 chip, and a keyboard encoder 66 for connection to and cooperation with keypad 12, encoder 66 preferably being a 74C922 chip. Both of these latter chips are manufactured by National Semiconductor.

In addition to input to the apparatus from keypad 12, input is provided from the vehicle speed sensor to microprocessor 60 through optoisolator 68. This device, which is preferably a 4N35 available from Motorola, provides 3500 volts of isolation, thereby protecting the microprocessor 60 from the general electrical system of the motor vehicle. In the case of a vehicle in which the speed sensor provides a signal which is appropriate for direct input into a microprocessor, such as in a vehicle equipped with an electronic speedometer, optoisolator 68 may be replaced by a simple amplifier or the like for direct input into microprocessor 60.

Other inputs may optionally be provided to the apparatus for inclusion of other data within the generated reports. For example, a fuel consumption sensor may be provided to store data relating to fuel usage. Additionally, keypad 12 may be used to provide further data, such as a vehicle identification number where the vehicle is one of a fleet of vehicles to aid in identifying the vehicle to which the data relates.

The primary apparatus output includes printer 70. In the preferred embodiment, this printer is a small thermal dot matrix printer, most preferably an EUY-ITL 1501 printer available from Panasonic. The printer includes seven dot cartridges 72 (two shown) which carry out the actual printing, and a motor 74 that drives the print head and paper roll 14 (FIG. 1). Both cartridges 72 and motor 74 are controlled by driver 76, which is preferably two DS3658 chip available from National Semiconductor. A tachometer 77 and a position detection switch 78 are also included within printer 70, to provide feedback to microprocessor 60 regarding the operation of the printer.

Additional output from microprocessor 60 is provided by LED 56 which, as has been noted, presents to the operator a memory full indication. Two additional LEDs 79 and 80 are mounted within keys 32 and 34 (FIG. 1) for cooperation with keys 32 and 34 to provide for the vehicle operator an indication of the purpose selected for the present vehicle trip, as has been described. Also, a beeper 81 produces a short tone for each keystroke on keypad 12 as confirmation of acceptance of the keystroke. LEDs 56, 79 and 80 and beeper 81 are all controlled by microprocessor 60 through solid state relays 82, which are preferably 55452 chips from National Semiconductor.

Several other components of the circuit shown in FIGS. 3A and 3B should be pointed out. Chip 84, which serves as a latch, is preferably a 78HC573 available from National Semiconductor, while select decoder 86 is one-half of a 74HC139 chip from National Semiconductor. Additionally, a number of switches 88 are indicated throughout the circuitry. Each switch 88 is a section of a 74HC4066 switch from National Semiconductor, which is a bi-directional analog switch operating essentially as a solid-state relay. Attention is directed to those switches 88 shown at 89, where a jumper 91 can optionally be connected to enable the switches at 89 to instruct microprocessor 60 to carry out one or more optional functions, to be noted below, without requiring additional inputs to the microprocessor.

Further details regarding the construction and operation of the circuitry of the apparatus will be readily apparent from FIGS. 3A and 3B to those skilled in the art.

Figure 4A:
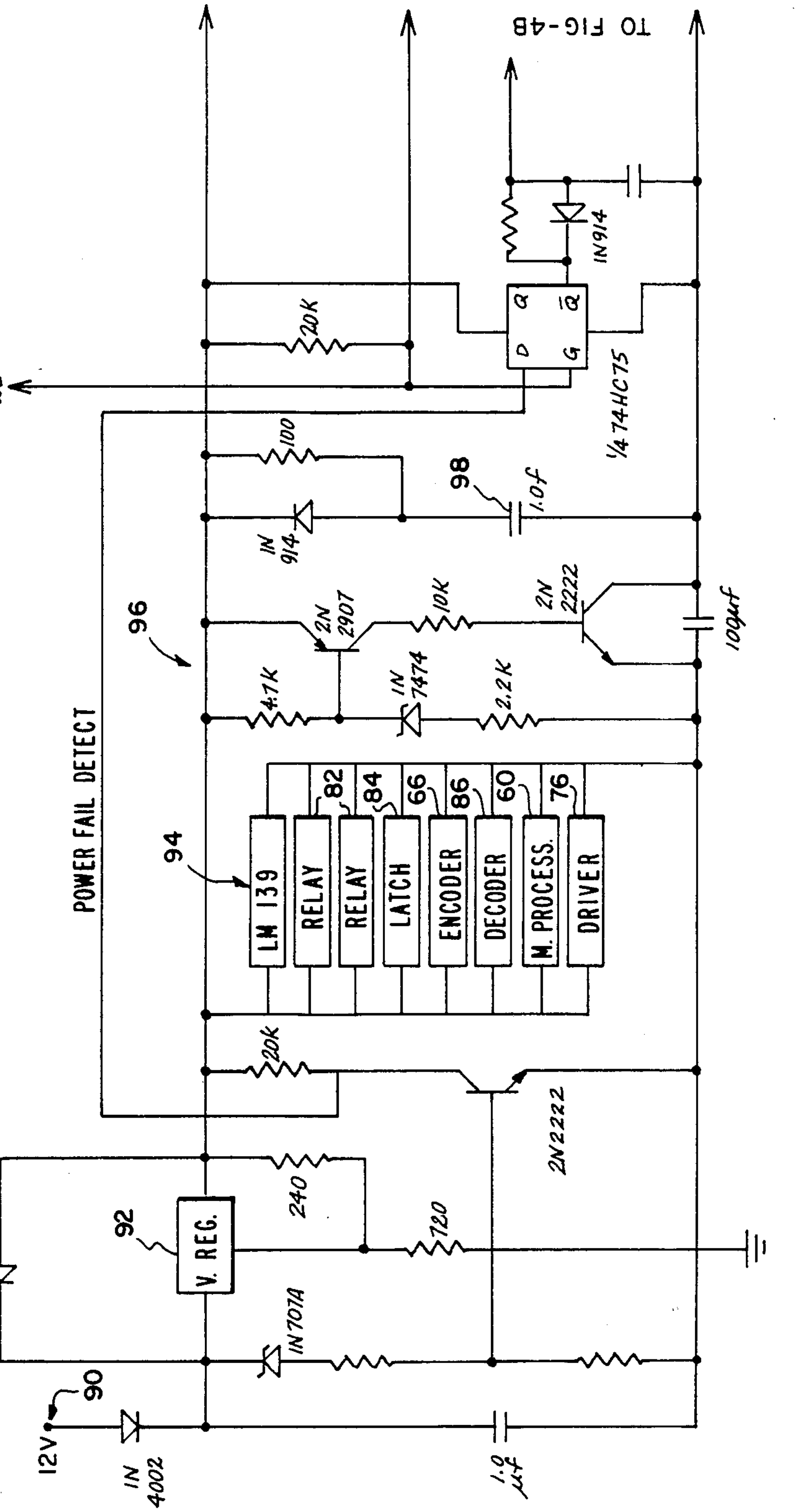
FIGS. 4A and 4B together are a schematic diagram of a portion of the power supply circuitry for the apparatus.
Figure 4B:
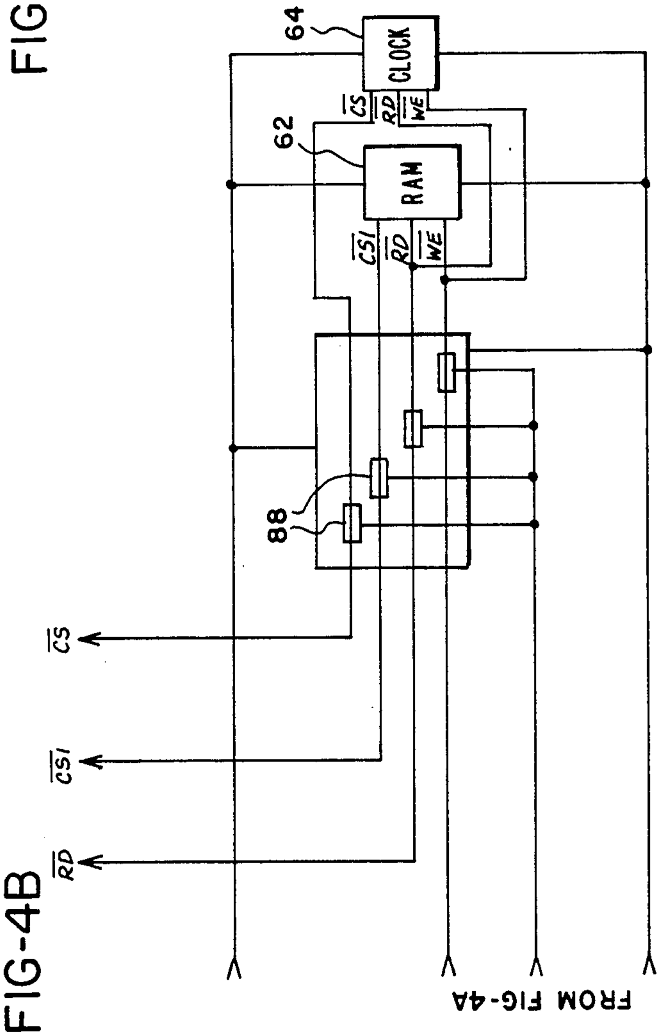

The power supply circuit for the control circuitry of FIGS. 3A and 3B is shown in detail in FIGS. 4A and 4B. From the general vehicle electrical system, 12 volts is supplied as input at 90. A voltage regulator 92, which is preferably an LM117H chip from National Semiconductor, is provided so that a constant five-volt supply is provided to the components of the control circuitry as indicated generally at 94.

A separate power supply circuit is provided for memory 62 and clock 64, to protect against loss of data or clock signals in the event of the vehicle battery being disconnected or run down. Appropriate circuitry is provided at 96 to charge a 1.0 f capacitor 98 during operation of the apparatus. This capacitor is sufficiently large that the apparatus can be operated from energy stored within capacitor 98 in the event of a power failure. A power failure detection circuit is also provided, so that if power is required from capacitor 98, apparatus functions such as printing and the like which have relatively large power requirements will not be carried out. Thus, the period of time during which power can be interrupted without detrimental effect to the stored data can be prolonged as long as possible.

Figure 5:
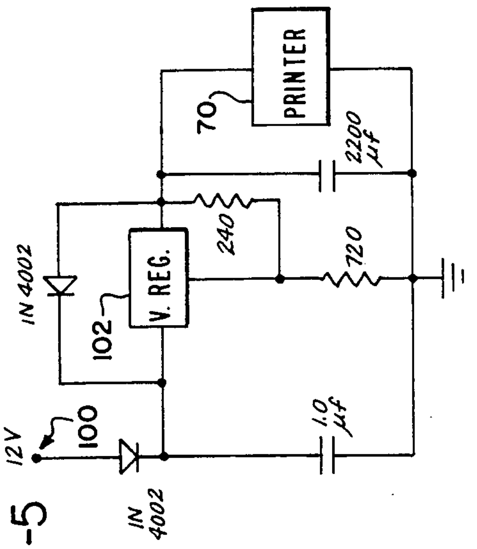
FIG. 5 is a schematic diagram of a further portion of the power supply circuitry for the apparatus.

As shown in FIG. 5, a parallel supply circuit, receiving 12 volts input at 100 and incorporating a voltage regulator 102, is provided to supply printer 70.

Further details regarding the power supply circuitry will be readily apparent to those skilled in the art from FIGS. 4A, 4B and 5.

Figure 6:
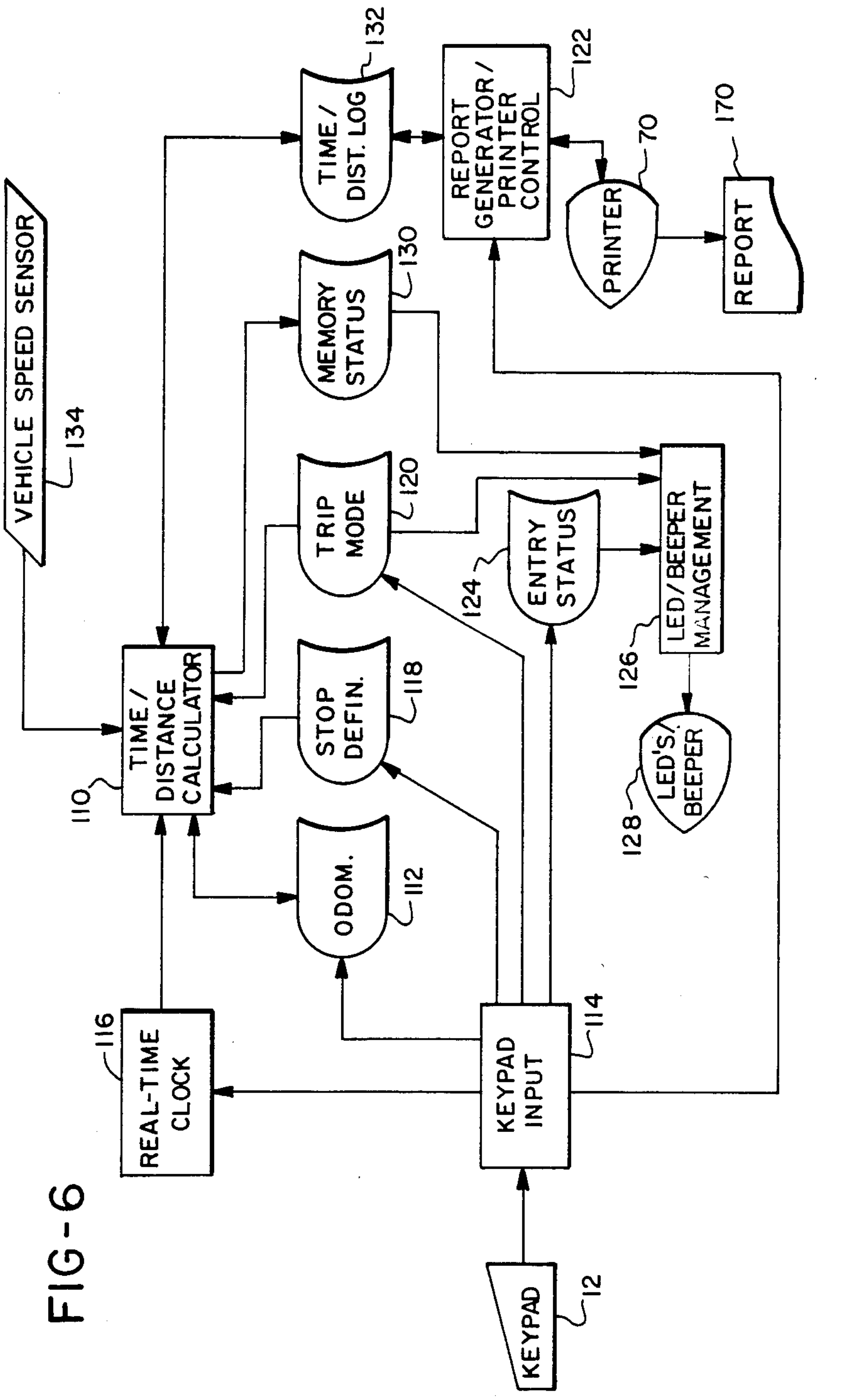
FIG. 6 is a diagram illustrating the operation of a program for controlling the apparatus.

The general operation of the control circuitry of FIGS. 3A and 3B can be seen by reference to FIG. 6, which presents a general diagram of the program executed by microprocessor 60.

The control program is designed to include five different processes, one example being time/distance calculator process 110. Each process cooperates with other processes and/or various ones of data files, such as odometer data file 112. Operator input to the apparatus is provided from keypad 12 which is accepted into the program through keypad input process 114. This process reviews the inputed sequence of keystrokes, determines the significance of the keystrokes, and directs the information contained in the sequence to the appropriate portions of the program. For example, real time clock process 116 is reset whenever new time and date settings are entered using keypad 12. Similarly, process 114 will load an odometer setting into odometer data file 112, and will place a minimum duration for defining a vehicle stop within data file 118. Actuation of keys indicating the purpose of a vehicle trip causes process 114 to place into trip mode database 120 an indication of such purpose. Actuation of the print key sends a starting signal to report generator/printer control process 122.

At the same time that any key of keypad 12 is depressed, process 114 loads into entry status database 124 an indication that a key has been depressed. As soon as this data is placed into data file 124, it is received oy LED/beeper management process 126, which subsequently drives beeper 128 for providing data entry feedback to the vehicle operator. Process 126 also receives data from data file 120, from which process 126 causes the appropriate LED 128 for the purpose of the trip to remain illuminated. Data is also received from memory status data file 130, which contains information as to the extent to which the apparatus memory is full. Upon receiving from data file 130 an indication that the memory is approaching a full condition, process 126 will cause the appropriate LED to illuminate.

Information relating to times and distances for vehicle trips is generated in time/distance calculator process 110. This process receives input from real time clock process 116, odometer data file 112, stop definition data file 118, trip mode data file 120, and a time/distance log data file 132. In addition, input is received from the vehicle speed sensor 134.

Figure 7:
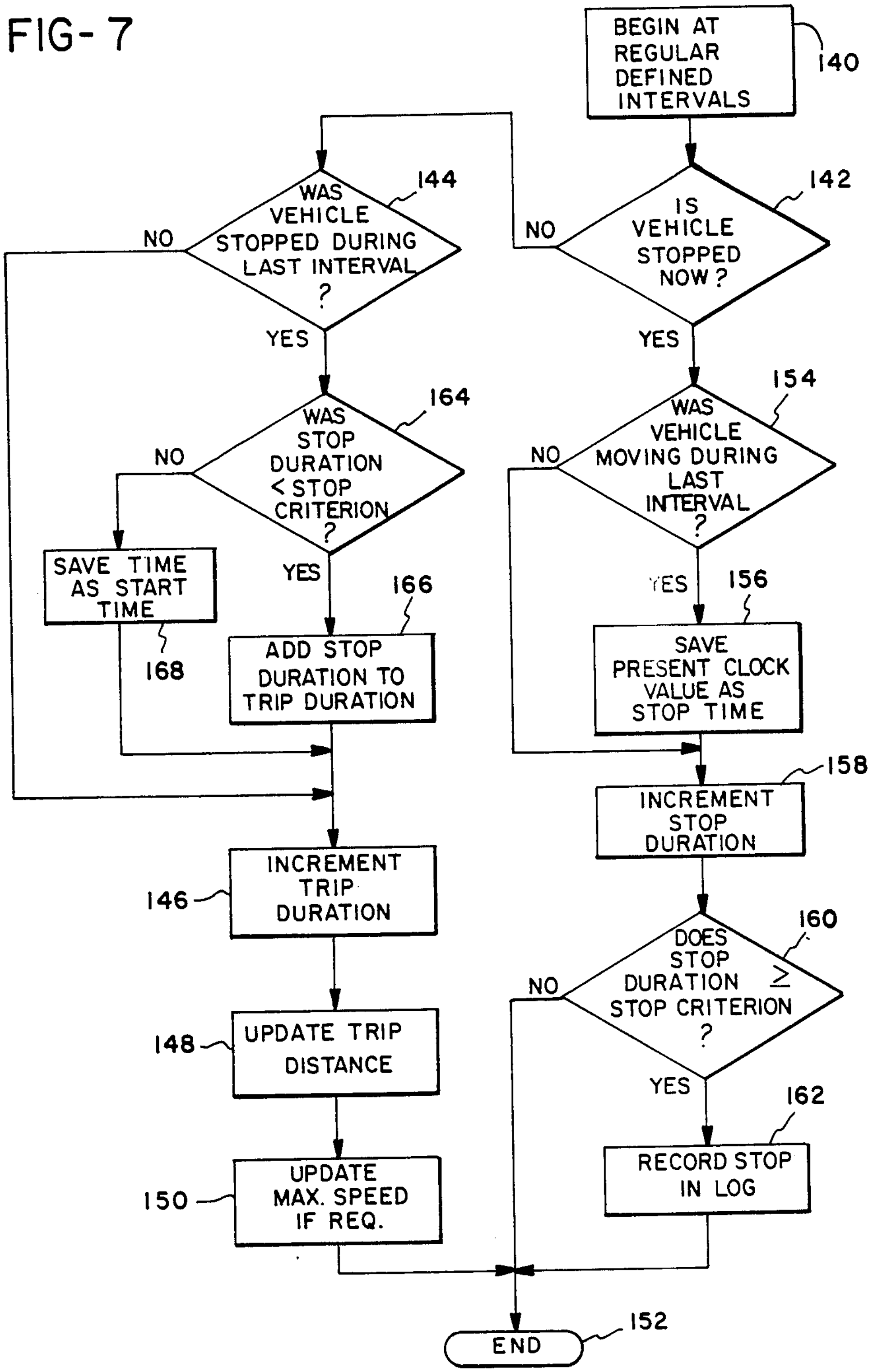
FIG. 7 is a flowchart diagram illustrating the operation of a portion of the program of FIG. 6.

Time/distance calculator process 110 is carried out using the program outlined in the flow chart of FIG. 7. As shown at block 140, the program is run at regular defined intervals, preferably on the order of one minute.

Initially, it is determined from the input from speed sensor 134 whether the vehicle is stopped during the present interval, as indicated at block 142. If not, the program inquires at block 144 as to whether the vehicle was stopped during the most recent prior interval. If not, then the trip duration is incremented, at block 146, and replaced into data file 132. Similarly, the trip distance is calculated and updated at block 148, and if the apparatus is so configured, the maximum speed is updated at block 150 if required. The program ends at block 152, after which, at the beginning of the next defined interval, the program is begun again at block 140.

Once the vehicle is stopped, at the next regularly defined interval, the program will branch at block 142 to block 154, where it is determined whether the vehicle was moving during the preceding interval. Assuming that the vehicle has just stopped, this inquiry will be answered affirmatively, and as shown at block 156, the present clock value will be saved as a potential stop time. In the event the vehicle was stopped during the preceding interval as well, this step will be bypassed, so that the potential stop time is retained.

The stop duration is incremented at block 158, and at block 160 it is compared with the minimum stop criterion to determine whether these two values are equal. If not, the program terminates at block 152. This will occur either when the stop duration is less than the minimum stop duration criterion, or when the stop duration exceeds this criterion. If the two values are equal, the trip just completed is deemed to be ended, and a stop is recorded in the log data file 132 a block 162.

Once the vehicle again begins moving, the program will branch from block 142 to block 144. Since immediately upon start up, the vehicle will have been stopped during the last interval, the program will move to block 164, where it is determined whether the duration of the stop just completed was less than the minimum stop criterion. If so, then the stop was not of sufficient length to terminate the current trip, and the stop duration is added at block 166 to the duration of the trip overall. If, on the other hand, the stop duration equaled or exceeded the minimum stop criterion, then the preceding trip was terminated, and the current time must be saved as a start time for the present trip at block 168.

The program then proceeds to block 146, where the trip duration is incremented, and ultimately to the end of the program at block 152.

In carrying out updating of trip distance at block 148, information regarding the vehicle odometer reading is retrieved from data file 112. This value is based upon the reading entered by the vehicle operator through keypad 12, as updated from information received through the speed sensor 134. The calculated odometer reading may, however, vary somewhat from the reading of the mechanical odometer within the vehicle. Therefore, to prevent loss of confidence by the operator in the data stored by the apparatus, microprocessor 60 is programmed to compare the next odometer reading entered through keypad 12 with that stored in data file 112, and to calculate therefrom a correction factor that is applied to all calculated updates of vehicle mileage until the next odometer reading is manually entered. In this manner, the calculated values will more closely correspond with values indicated by the mechanical odometer. However, if the correction factor exceeds a certain predetermined value, such as 10%, a malfunction in the vehicle odometer or the apparatus is assumed, and the correction factor is ignored.

Returning to FIG. 6, upon receiving instructions entered through keypad 12, report generator/printer control process 122 will interact with printer 70 to generate a report 170 similar to that shown on sheet 38 in FIG. 2. A separate report will be printed for each day's activity.

Other practical variations using the basic disclosed apparatus are possible. For example, rather than providing data output at the printer, stored data can be directed to a computer where it can be monitored over a long period of time, or alternatively, where data relating to a number of vehicles within a fleet can be stored. In such a case, printer 70 can be eliminated from the apparatus, and some type of data transfer linkage must be provided.

As one example, the apparatus may include an infrared transmitter and receiver which communicates with a base station also having a transmitter and receiver. Where a fleet of motor vehicles is involved, the base station could be installed at the entrance to the vehicle storage lot, so that as the vehicles are driven into or out of the lot, data is transferred from the apparatus within an individual vehicle, through the base station and to a central computer. In such a case, it could be possible to eliminate the key pad for eacn vehicle, with the starting odometer reading being entered on a keypad at the base station, thereby reducing the size and per vehicle cost for the apparatus.

As another alternative, the apparatus could be provided with a modem and a phone jack, so that data could be sent over telephone lines to the central computer. Such an approach would be helpful, for example, where the motor vehicle is used for frequent long distance driving.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Apparatus for monitoring use of a motor vehicle, said vehicle including an odometer and means for generating a vehicle speed input signal, the apparatus comprising:

clock means for generating a real-time signal;

processor means for receiving said vehicle speed input signal and said time signal, and (a) upon receiving said vehicle speed input signal to indicate movement of the vehicle following a period of non-movement greater than a predetermined stop duration value, generating a trip starting time, and (b) following generation of said trip starting time and until said vehicle speed input signal indicates non-movement of the vehicle for at least said predetermined stop duration value, calculating a trip duration value and a trip distance value based on said time signal and said vehicle speed input signal;

storage means connected to said processor means for receiving and storing said trip starting time, said trip duration value and said trip distance value.

2. Apparatus as defined in claim 1, further comprising operator-actuated input means selectively generating said predetermined stop duration value as selected by an operator.

3. Apparatus as defined in claim 1, further comprising:

operator-actuated input means for selectively generating an odometer signal corresponding to a current reading on said odometer;

said processor means further receiving said odometer signal, and generating a current odometer value; said processor means further upon receiving said odometer signal comparing said current reading on said odometer with said odometer signal to generate a correction factor; said processor means thereafter applying said correction factor to said current reading.

4. Apparatus as defined in claim 1, further comprising:

operator-actuated input means for selectively generating an operator input signal corresponding to one of a plurality of differing selectable categories of useage for the vehicle during each period of operation thereof, said operator input signal being supplied to said processor means;

said processor means receiving said operator input signal and generating data identifying said trip starting time, said trip duration value and said trip distance value with one of said categories of usage;

said storage means receiving and storing said data with said trip starting time, said trip duration value and said trip distance value.

5. Apparatus as defined in claim 1, further comprising:

operator-actuated input means for selectively generating an operator input signal supplied to said processor means;

said processor means, upon receiving said operator input signal, causing said clock means to be reset.

6. Apparatus as defined in claim 1, wherein the vehicle includes means for generating and storing electric power, and said apparatus further comprises power supply means for connection to the vehicle generating and storing means for providing electric power to the apparatus for operation thereof from the vehicle generating and storing means.

7. Apparatus as defined in claim 6, wherein said power supply means includes power back-up means for storing a portion of the electric power received from the vehicle generating and storing means, and for providing stored power to the apparatus in the event supplying of power from the vehicle generating and storing means is interrupted.

8. Apparatus as defined in claim 1, wherein said processor means is further for monitoring said storage means to determine a memory condition wherein said storage means is at or above a predetermined proportion of data capacity, and further comprising means for indicating to an operator of the apparatus that said memory condition exists, said indicator means being connected to said processor means for actuation thereby.

9. Apparatus as defined in claim 4, further comprising:

output means for periodically receiving said trip starting time, said trip duration value and said trip distance value from said storage means for providing an output of data to an operator; and a unitary housing for containing said clock means, said processor means, said storage means, said input means and said output means.

10. Apparatus as defined in claim 9, wherein said output means includes a printer for providing output of said data in printed form.

11. Apparatus as defined in claim 4, further comprising:

first operator-actuated input means for selectively generating a first operator input signal corresponding to one of a plurality of differing selectable categories of usage for the vehicle during each period of operation thereof, said first operator input signal being supplied to said processor means;

said processor means receiving said first operator input signal and generating, as part of an information signal, data identifying each of said periods of operation by one of said categories of usage.

12. Apparatus as defined in claim 11, further comprising:

second operator-actuated input means for selectively generating a second operator input signal supplied to said processor means;

said processor means, upon receiving said second operator input signal, causing said clock means to be reset.

13. Apparatus as defined in claim 12, further comprising:

third operator-actuated input means for selectively generating a third operator input signal supplied to said processor means;

said processor means being further adapted for generating from said vehicle speed input signal data and said time signal as part of said information signal data including a calculated odometer value for the vehicle corresponding to starting of each of said periods of operation of the vehicle;

said processor means, upon receiving said third operator input signal, causing said odometer value to be reset.

14. Apparatus as defined in claim 13, wherein said first, second and third operator actuating means include a keypad mounted on said housing, said keypad including a plurality of operator-actuated keys.

15. Apparatus as defined in claim 14, further comprising indicator means for providing to an operator an indication that one of said keys corresponding to said first operator-actuated input means has been actuated.

16. Apparatus as defined in claim 15, wherein said indicator means causes said indication to be visually perceptible by the operator.

17. Apparatus as defined in claim 15, wherein said indicator means causes said indication to be aurally perceptible by the operator.

18. Apparatus as defined in claim 14, further comprising indicator means for providing to an operator an indication that any of said keys of said keypad has been actuated.

19. Apparatus as defined in claim 18, wherein said indicator means causes said indication to be visually perceptible by the operator.

20. Apparatus as defined in claim 10, wherein said indicator means causes said indication to be aurally perceptible by the operator.

21. Apparatus as defined in claim 1, wherein said output means includes a printer for providing output of said data in printed form.

22. Apparatus as defined in claim 1, wherein:

said processor means is additionally for monitoring said speed input signal, and determining a maximum speed value attained by the vehicle during the period from said trip starting time until said vehicle speed input signal indicated non-movement of the vehicle for at least said predetermined stop duration value; and said storage means is additionally for receiving and storing said maximum speed value.

* * * * *